US008393088B1

(12) United States Patent
Palisano

(10) Patent No.: US 8,393,088 B1
(45) Date of Patent: Mar. 12, 2013

(54) PARKING LOT PAINTING TEMPLATE

(76) Inventor: Kenneth J. Palisano, North Port, FL (US)

( * ) Notice: Subject to any disclaimer, the term of this patent is extended or adjusted under 35 U.S.C. 154(b) by 256 days.

(21) Appl. No.: 13/005,013

(22) Filed: Jan. 12, 2011

(51) Int. Cl.
*G01B 3/14* (2006.01)
*B43L 7/00* (2006.01)

(52) U.S. Cl. ........ 33/562; 33/613

(58) Field of Classification Search ........ 33/32.1, 33/32.2, 452, 454, 562, 565, 566, 613, 645
See application file for complete search history.

(56) References Cited

U.S. PATENT DOCUMENTS

| | | | | |
|---|---|---|---|---|
| 1,066,694 | A * | 7/1913 | Ash | 33/562 |
| 4,080,742 | A * | 3/1978 | Osterried | 33/565 |
| 4,770,216 | A * | 9/1988 | Ruscak | 33/562 |
| 5,519,940 | A | 5/1996 | Brondfield | |
| 7,080,462 | B2 * | 7/2006 | Nickell | 33/645 |
| 7,252,463 | B2 * | 8/2007 | Valdez | 33/562 |
| 2006/0102023 | A1 | 5/2006 | Rivera | |
| 2006/0191150 | A1 * | 8/2006 | Sikora et al. | 33/566 |
| 2012/0227275 | A1 * | 9/2012 | Goldrick et al. | 33/562 |

* cited by examiner

*Primary Examiner* — G. Bradley Bennett
(74) *Attorney, Agent, or Firm* — Montgomery Patent & Design LLC; Robert C. Montgomery

(57) ABSTRACT

A parking lot painting template for determining the location of successive parking stall stripes or curb stripes accurately and subsequently painting a straight line in the desired location includes a main member, a rail member, and a pair of curb members. The main member and the rail member combine to form a frame which is of a length corresponding to the width of the parking stalls such that a user may align an end of the main member with a stripe and accurately determine the proper location of the next stripe. The main member and the curb members combine to form a frame designed to slide securely along a corner edge such as an existing curb and accurately paint in the proper location.

20 Claims, 7 Drawing Sheets

PARKING LOT PAINTING TEMPLATE

RELATED APPLICATIONS

The present invention was first described in a notarized Official Record of Invention on Apr. 14, 2010, that is on file at the offices of Montgomery Patent and Design, LLC, the entire disclosures of which are incorporated herein by reference.

FIELD OF THE INVENTION

The present invention relates generally to marking devices, and in particular, to parking lot and curb painting template.

BACKGROUND OF THE INVENTION

The proper tool saves time, saves money, produces a higher quality job, reduces damage to equipment, and provides for increased safety of workers. One (1) situation where proper tools are important is that of parking lot painting. Most parking lots are randomly shaped areas that require a meticulous layout to fit in the most vehicles in a safe manner. Additionally, areas around handicapped spots, walkways, or no parking zones are typically painted with a series of parallel hash lines in a repeating fashion. This layout typically requires two (2) people to complete and can take as much time as an entire parking lot.

While various painting machines, line stripers, or other templates are conventionally available for marking and painting parking lots and curbs, none of these devices offer the flexibility to simply and efficiently paint a smaller number of lines or areas at a low cost. The most common devices are large and expensive paint striping machines which may not be an option for smaller lots or touch up work since appropriately sized templates are unavailable.

SUMMARY OF THE INVENTION

The inventor has therefore recognized the aforementioned inherent problems and lack in the art and observed that there is a need for a device for quickly and easily laying out and painting parking lot spaces and parallel hashed lines in parking lots without the inefficiencies as described above. In accordance with the invention, it is an object of the present disclosure to solve these problems.

The inventor recognized these problems and has addressed this need by developing a parking lot painting template that allows for parking lot and space layout in a manner which is easy, effective, and much faster than conventional methods. The inventor has thus realized the advantages and benefits of providing a device having a generally “C”-shaped main member having an elongated center portion and a pair of parallel arm portions. Each arm portion is disposed on an opposing end of the center portion and includes at least one (1) fastener. An elongated rail member is removably coupled to the pair of arm portions by the fasteners. The rail member includes a pair of rail slots disposed on opposite ends for insertingly receiving the pair of arm portions. When a rail member is coupled to the main member, the open space between the main member center portion and the rail member defines a liner parking lot painting area.

A pair of curb members is also provided and each is removably coupled to the pair of arm portions by the fasteners. Each of the curb members includes a generally “L”-shaped member having a leg portion with a curb slot for receiving the arm portion and a downwardly perpendicular foot portion for contact with a vertical surface of the curb. When the pair of curb members is coupled to the main member, the open space between the main member center portion and the curb vertical surface defines a curb painting area.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
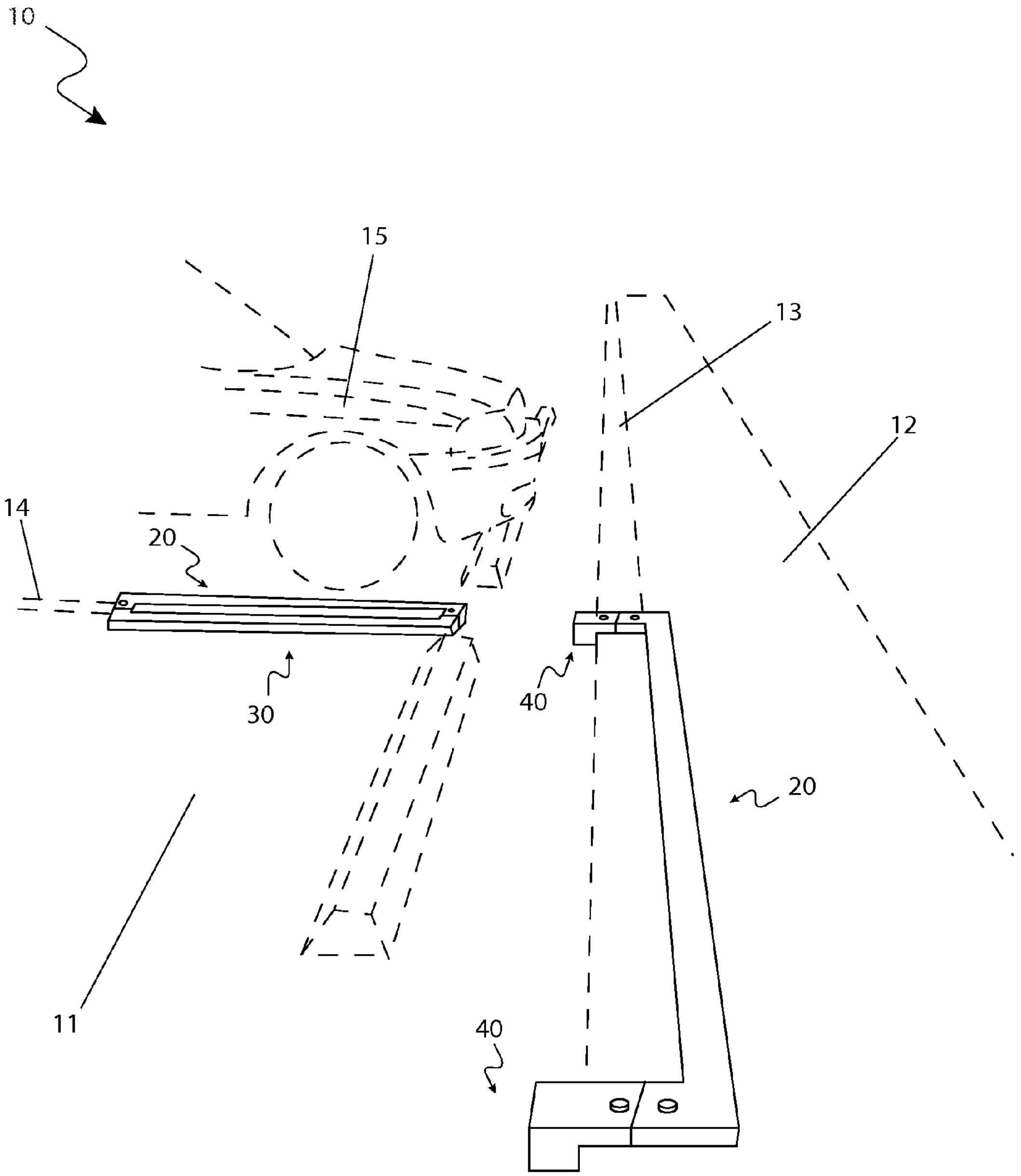
FIG. 1 is an environmental view of a parking lot painting template 10, according to a preferred embodiment in accordance with the invention.

| DESCRIPTIVE KEY | |
|---|---|
| 10 | parking lot painting template |
| 11 | parking lot |
| 12 | side walk |
| 13 | curb |
| 14 | parking line |
| 15 | vehicle |
| 20 | main member |
| 21 | elongated portion |
| 22 | arm portion |
| 23 | spring return button |
| 24 | main member slot |
| 30 | rail member |
| 31 | rail body |
| 32 | rail slot |
| 33 | rail aperture |
| 35 | painting area |
| 40 | curb member |
| 41 | leg portion |
| 42 | foot portion |
| 43 | curb aperture |
| 44 | curb slot |
| 45 | curb painting area |

DETAILED DESCRIPTION OF THE PREFERRED EMBODIMENT

In accordance with the invention, the best mode is presented in terms of a preferred embodiment, herein depicted within FIGS. 1 through 8. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

In accordance with the invention, the present disclosure describes a parking lot painting template (herein described as a "device") 10, which provides for accurately painting a straight line on a parking lot 11 or on a curb 13. The device 10 is utilized in a parking lot 11 to paint parking lines 14 which separate parked vehicles 15. The device 10 is also utilized on a sidewalk 12 to paint a curb 13. The device 10 allows a user to determine and accurately create successive markings as desired through a stenciling technique. The device 10 is utilized with painting equipment such as, but not limited to: spray paint, rollers, brushes, or the like.

Referring now to FIG. 1, an environmental view of the device 10 is disclosed. The device 10 assists in the layout of lines, dashes, or the like in parking lots 11, crosswalks, and similar parking or no-parking areas. The device 10 includes a main member 20, a rail member 30, and a pair of curb members 40. The main member 20 and the rail member 30 are utilized jointly to create parking lines 14. The main member 20 and the curb members 40 are utilized jointly to paint curbs 13. The device 10 is preferably fabricated from aluminum, yet other lightweight and durable materials may be utilized without limiting the scope of the device 10.

Figure 2:
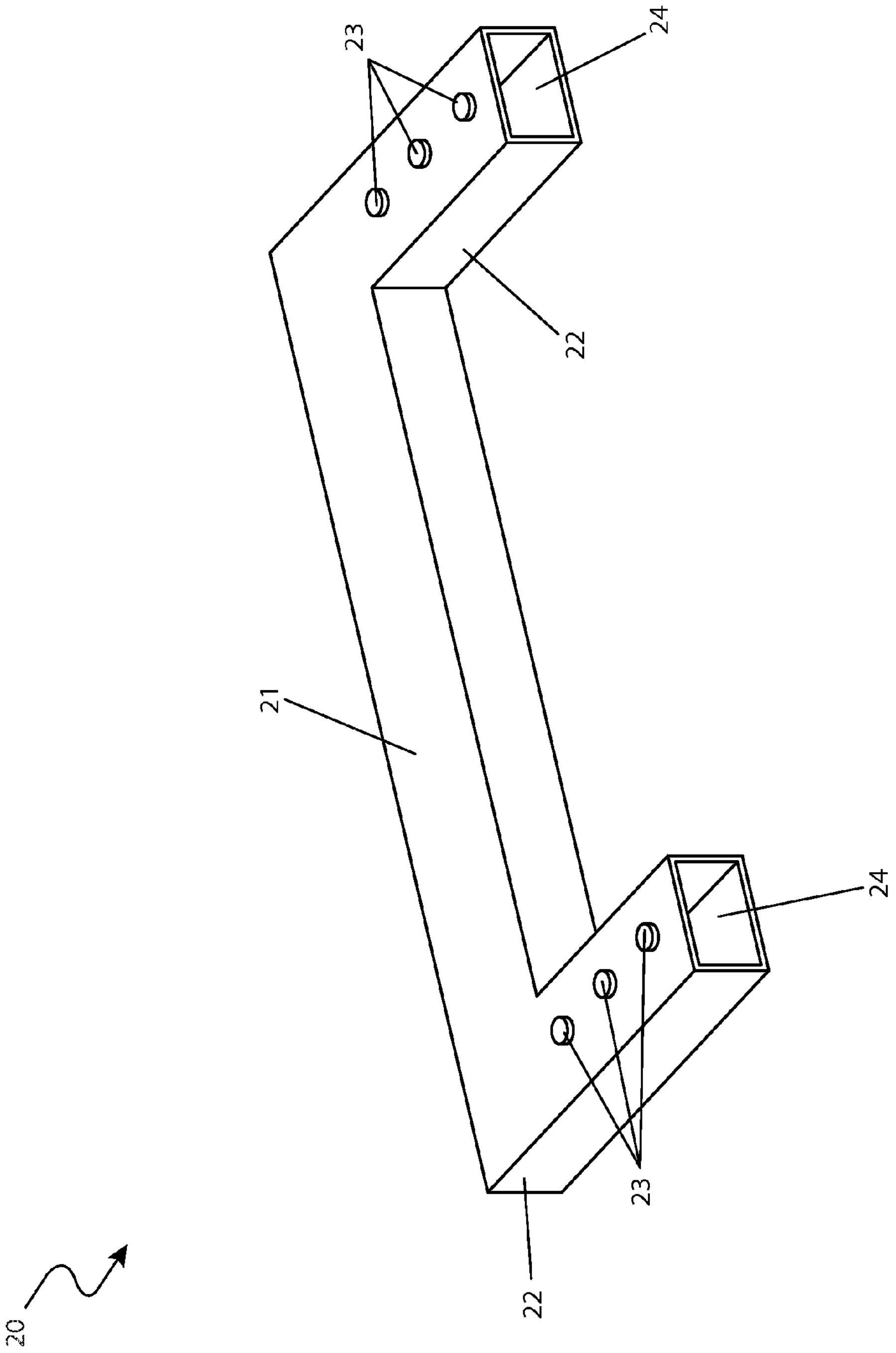
FIG. 2 is a perspective view of a main member 20, according to the preferred embodiment.
Figure 3:
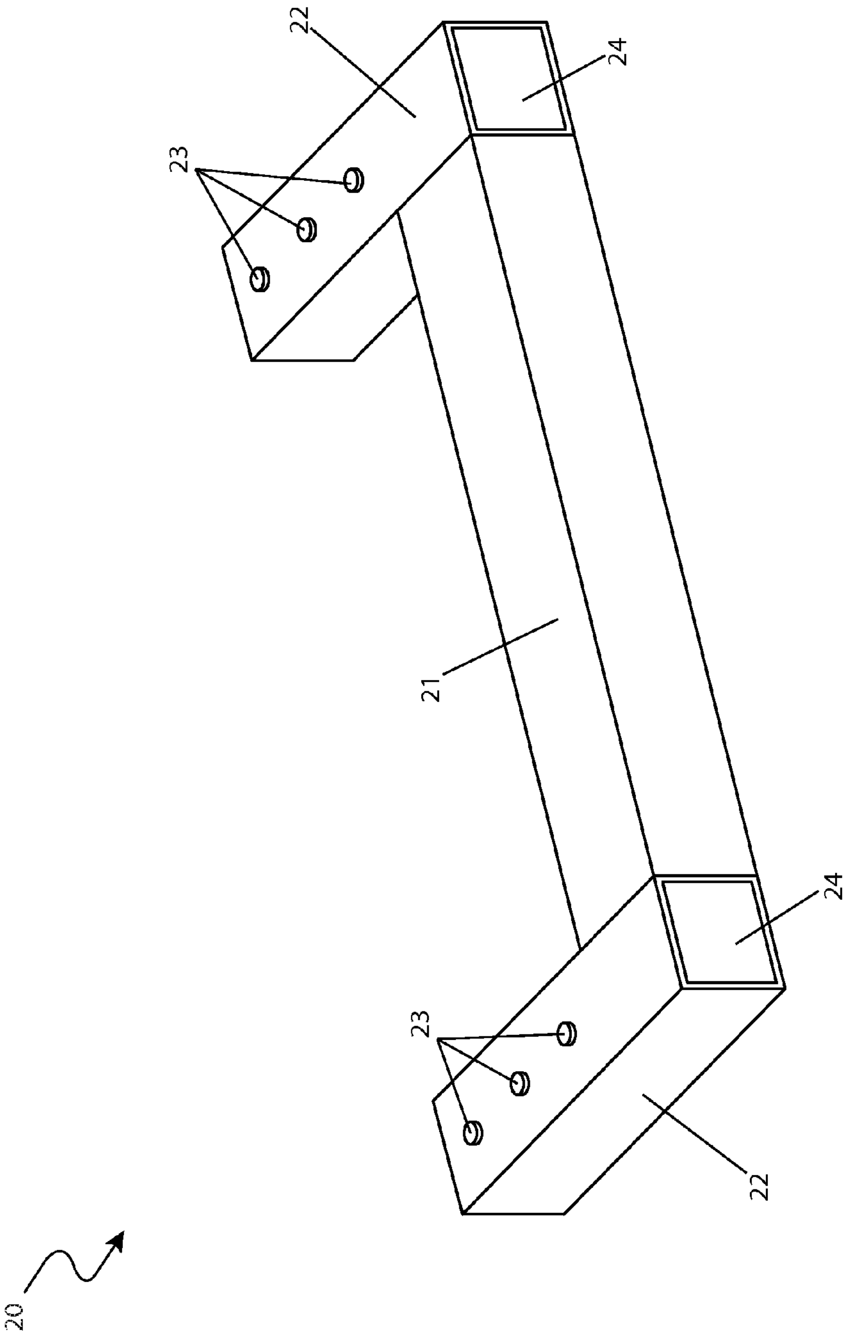
FIG. 3 is an opposing perspective view of the main member 20, according to the preferred embodiment.

Referring now to FIG. 2, a perspective view of the main member 20 and FIG. 3, an opposing perspective view of the main member 20 are disclosed. The main member 20 has a generally "C"-shape which includes an elongated portion 21 and a pair of arm portions 22. The arm portions 22 are integrally molded to opposing ends of the elongated portion 21 in a perpendicular orientation. An upper surface of each arm portion 22 includes a plurality of aligned digit-operated spring return buttons 23 which provide for the engaging to and securing of the rail member 30 and curb members 40 (see FIGS. 5 and 8). The spring return buttons 23 correspond to the desired thickness of the parking line (see FIG. 5). The spring return buttons 23 extend parallel with each arm portion 22. Each spring return button 23 may be devices such as spring steel or a helical spring which are molded into an upper surface of each arm portion 22. The spring return buttons 23 include a spring disposed within an interior of the main member 20 and engage internal surfaces to provide an upwardly directed force to the spring return button 23 in order to protrude beyond a top exterior surface of the main member 20. The main member 20 is depicted as having a hollow elongated portion 21 and arm portions 22, which decreases the weight of the main member 20. The hollow body of the main member 20 is for illustration purposes only it can be appreciated that the main member 20 can also include a solid body without limiting the scope of the device 10.

Figure 4:
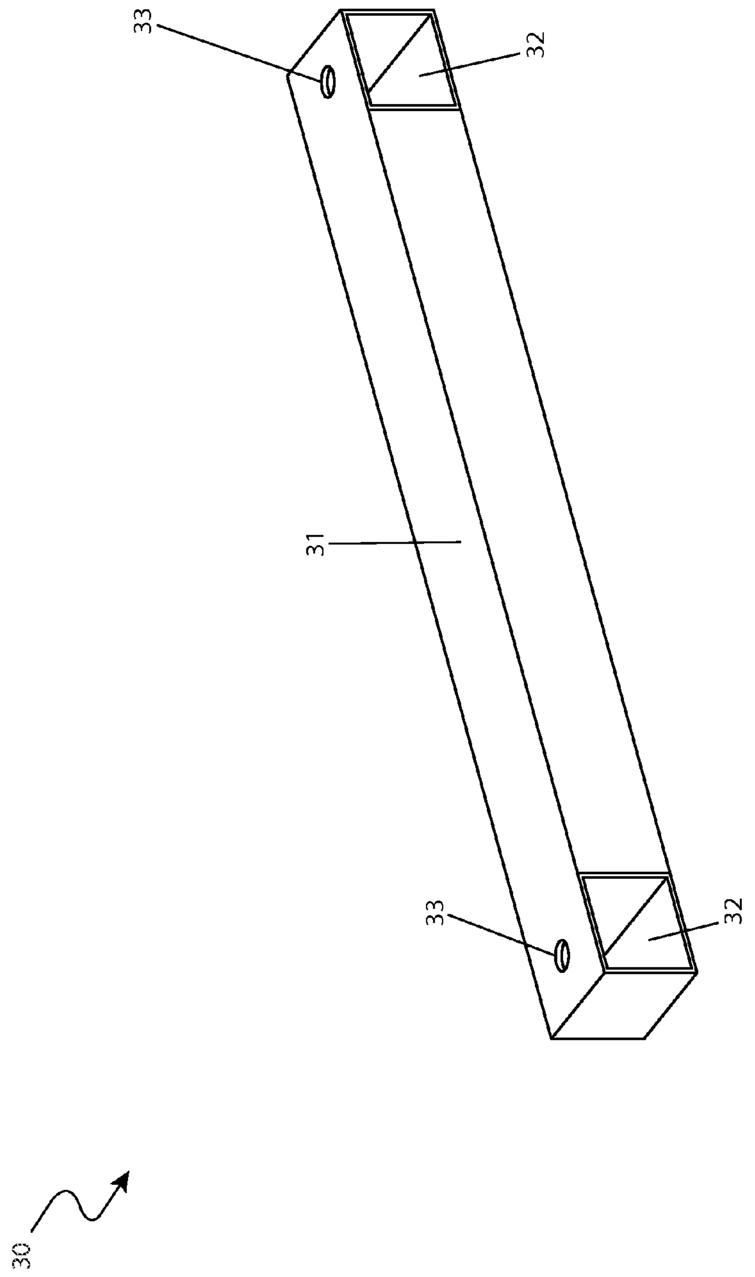
FIG. 4 is a perspective view of a rail member 30, according to the preferred embodiment.
Figure 5:
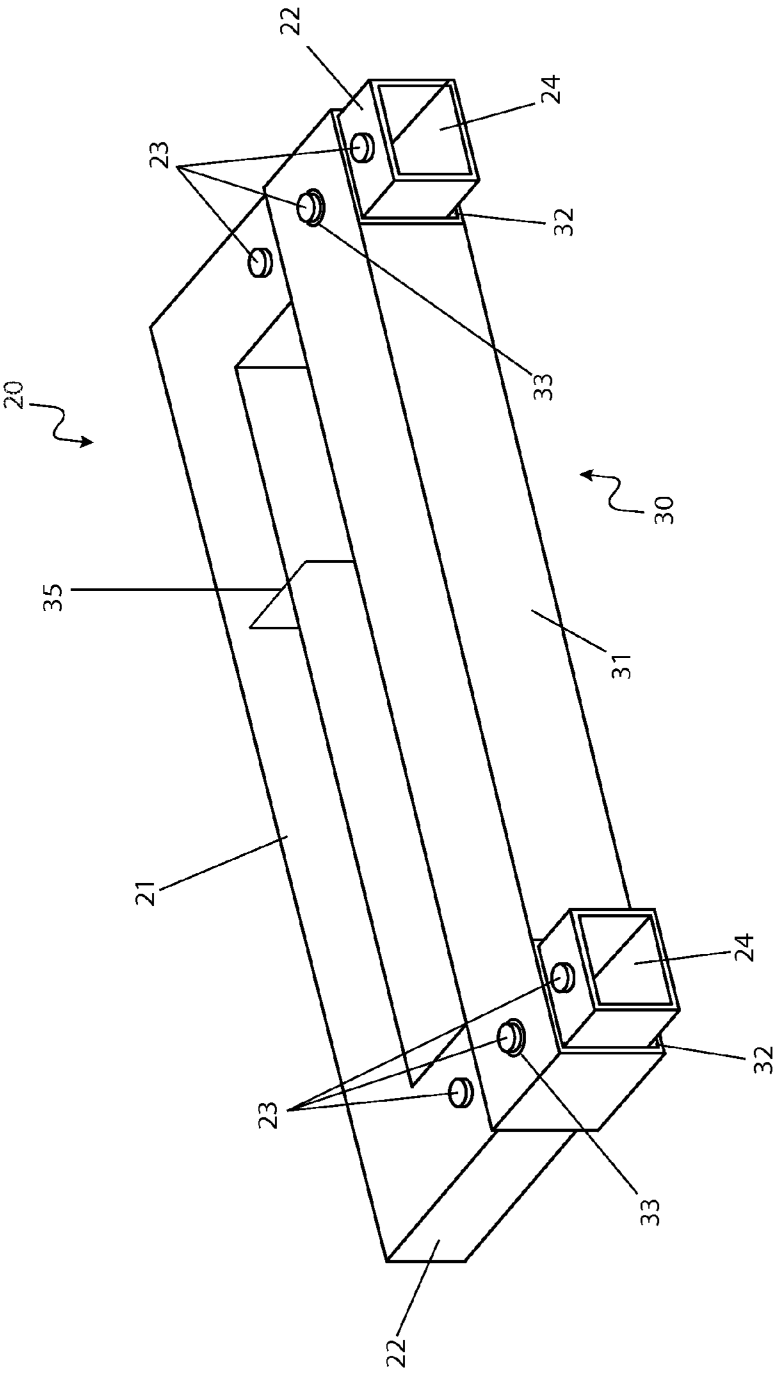
FIG. 5 is a perspective view of the rail member 30 depicted as engaged with the main member 20, according to the preferred embodiment.

Referring now to FIG. 4, a perspective view of the rail member 30 and FIG. 5, a perspective view of the rail member 30 engaged with the main member 20 are disclosed. The rail member 30 has a linear rail body 31 which provides an extension to the main member 20 provides the template for at least one parking line 14. A rail slot 32 is located at each end of the rail member 30 perpendicular to a longitudinal axis of the rail member 30. Each rail slot 32 includes a generally rectangular aperture suitably sized to receive and engages the arm portions 22 of the main member 20. The length of the rail member 30 corresponds to the length of the main member 20 such that the rail slots 32 are aligned with the arm portions 22. The rail slots 32 include dimensions which are slightly larger than the dimensions of the arm portions 22, such that the arm portions 22 slidingly insert into the rail slots 32. The rail member 30 is preferably fabricated from a material similar to the main member 20.

The rail member 30 also includes a pair of rail apertures 33 which is located on an upper surface of opposing ends of the rail member 30 through to each rail slot 32. Each rail aperture 33 insertingly receives a relative, corresponding spring return button 23 to secure the rail member 30 to the main member 20 (as shown in FIG. 5). When the rail slots 32 engagingly receive the arm portions 22, the spring return buttons 23 insertingly engage the rail aperture 33 to create a generally rectangular painting area 35. The painting area 35 is utilized as the stencil template for a user to paint the parking line 14. The width of the painting area 35 is customized by positioning the pair of rail apertures 33 to engage a particular pair of spring return buttons 23.

Figure 6:
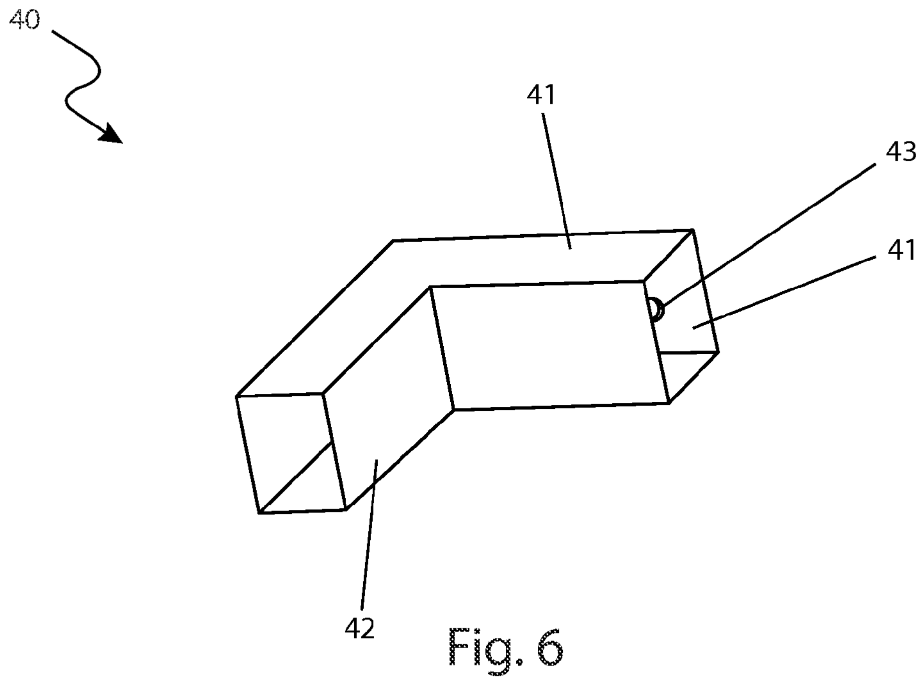
FIG. 6 is a perspective view of a single curb member 40, according to the preferred embodiment.
Figure 7:
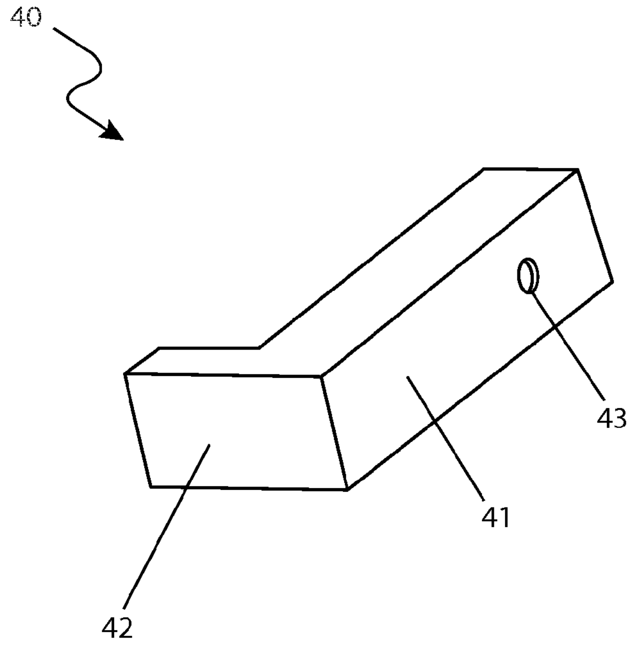
FIG. 7 is a perspective view of a single curb member 40, according to the preferred embodiment of the present invention; and, FIG. 8 is a perspective view of each curb member 40 depicted as engaged with the main member 20, according to the preferred embodiment.
Figure 8:
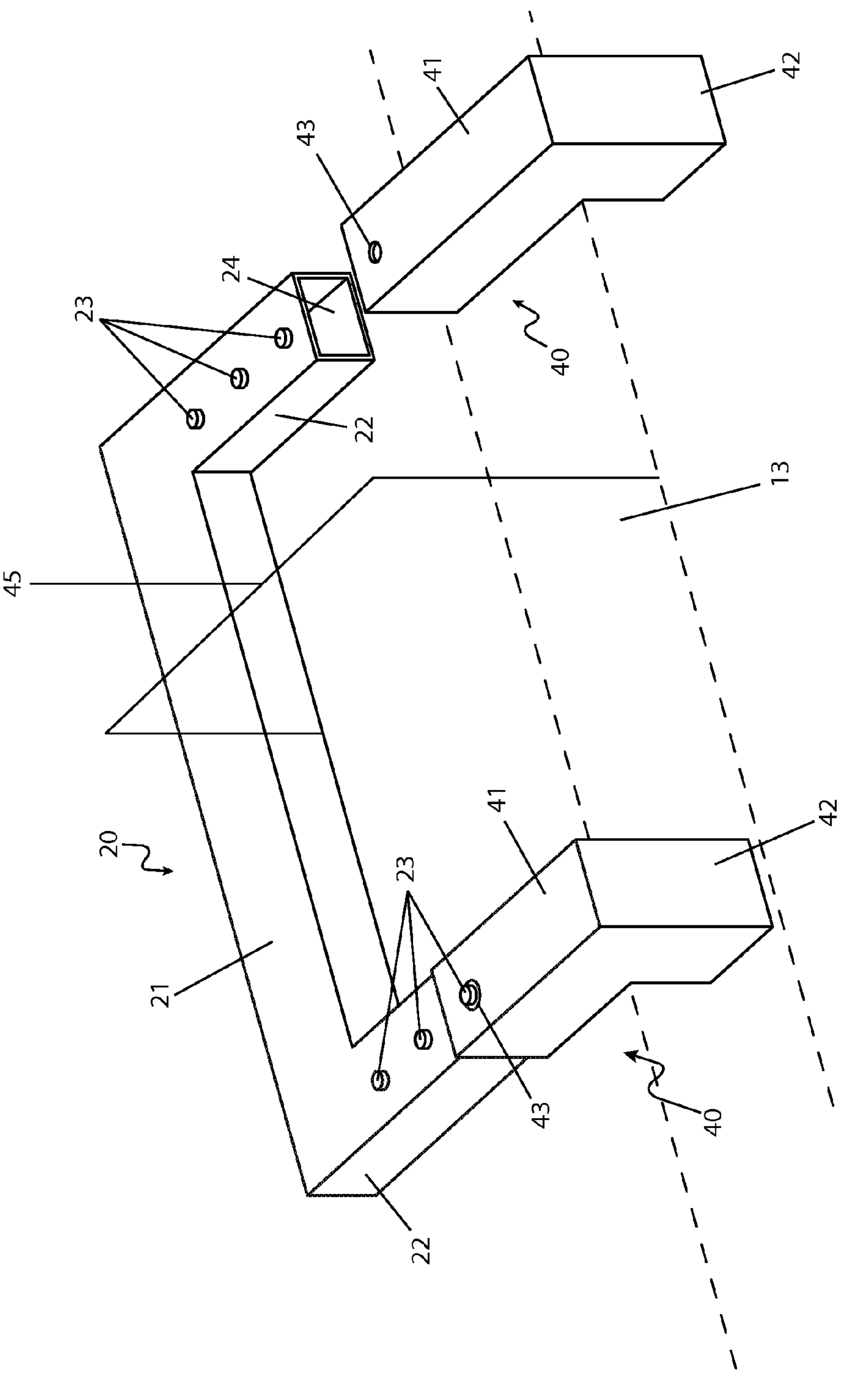

Referring now to FIGS. 6 and 7, perspective views of the curb member 40 and FIG. 8, a perspective view of the curb member 40 engaged with the main member 20 are disclosed. The pair of curb members 40 is utilized with the main member 20 to create a stencil which can be placed upon a curb 13 for painting "L"-shaped lines. Each curb member 40 includes a leg portion 41 and an integrally molded foot portion 42 perpendicular to the leg portion 41. The curb members 40 are fabricated from a material similar to the main member 20. The leg portion 41 includes a generally rectangular curb slot 44 located on an end to slidably engage the arm portion 22 of the main member 20. A curb aperture is located through an upper surface of the leg portion 41 adjacent to an edge. The curb slot 44 has dimensions slightly larger than the dimensions of the arm portion 22 to slidingly receive the arm portion 22 such that the spring return button 23 engages a respective curb aperture 43 which secures each curb member 40 to the main member 20 (as shown in FIG. 8). With each leg portion 41 attached to each arm portion 22, the foot portions 42 are oriented downwardly relative to the leg portions 41 and engage the vertical surface of the curb 13. The exposed area between the arm portions 22 and curb members 40 created a curb painting area 45 which can then be painted.

The foot portion 42 are illustrated as having a hollow body, however, it can be appreciated that the foot portion 42 can also include a solid body without limiting the scope of the device 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of installing and utilizing the device 10 as a line painting device may be achieved by performing the following steps: positioning the main member 20 on a level surface; slidably engaging the rail slots 32 to the arm portions 22 and locking to a desired position via engaging the spring return buttons 23 with the rail apertures 33; placing the main member 20 and rail member 30 on a desired location; and, painting parking lines 14 via applying paint between the painting area 35.

The method of installing and utilizing the device 10 as a curb painting device may be achieved by performing the following steps: positioning the main member 20 on a level surface; slidably engaging the leg portions 41 on the curb members 40 to the arm portions 22 and locking to a desired position via engaging the spring return buttons 23 with the curb apertures 43; placing the main member 20 and curb member 40 on a desired location curb 13; and, painting the curb 13 via applying paint between the curb painting area 45.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A template device for marking painted lines on a parking lot surface, said device comprising:

a generally C shaped main member having an elongated center portion and a pair of parallel arm portions, each arm portion is disposed on an opposing end of said center portion; and, an elongated rail member having a pair of rail slots disposed on opposite ends;

wherein said pair of rail slots insertingly receives said pair of arm portions to couple said rail member to said main member.

2. The device of claim 1, wherein each of said pair of arm portions further comprises at least one fastener for engaging each of said pair of rail slots to removably couple said rail member to said main member;

wherein an open space between said main member center portion and said rail member defines a painting area.

3. The device of claim 2, wherein said fastener further comprises a spring return mechanism having a head protruding beyond an upper surface of said arm portion;

wherein said head actuates downwardly to at least a coplanar position relative to said arm portion upper surface.

4. The device of claim 3, wherein said rail member further comprises a pair of rail apertures disposed on opposite ends of an upper surface aligned with said pair of rail slots;

wherein said pair of rail apertures receive a corresponding pair of fastener heads.

5. The device of claim 4, wherein each of said arm portions further comprises a plurality of fasteners;

wherein a pair of opposing fastener heads insertingly engages said pair of rail apertures to adjustably couple said rail member to said main member.

6. The device of claim 5, wherein said main member and said rail member each further comprises a generally rectangular shape.

7. The device of claim 5, wherein said main member and said rail member further comprise a generally planar lower surface.

8. The device of claim 1, further comprising a pair of curb members removably coupled to said pair of arm portions for marking painted lines on a curb surface.

9. The device of claim 8, wherein each of said pair of curb members further comprises a generally L shaped member having a leg portion and a downwardly perpendicular foot portion;

wherein said leg portion further comprises a curb slot for receiving said arm portion; and, wherein said foot portion contacts a vertical surface of said curb.

10. The device of claim 9, wherein each of said pair of arm portions further comprises at least one fastener for engaging said curb member leg portion to removably couple said pair of curb members to said main member;

wherein an open space between said main member center portion and said curb vertical surface defines a painting area.

11. The device of claim 10, wherein said fastener further comprises a spring return mechanism having a head protruding beyond an upper surface of said arm portion;

wherein said head actuates downwardly to at least a coplanar position relative to said arm portion upper surface.

12. The device of claim 11, wherein each of said pair of curb members further comprises a curb aperture disposed on an upper surface of said leg portion;

wherein said curb apertures receive a corresponding pair of fastener heads.

13. The device of claim 12, wherein each of said arm portions further comprises a plurality of fasteners;

wherein a selected fastener head of each arm portion insertingly engages said curb aperture of each leg portion to adjustably couple said curb member to said main member.

14. The device of claim 5, wherein said main member and said pair of curb members further comprise a generally planar lower surface.

15. A template device for marking painted lines on a parking lot or curb surface, said device comprising:

a generally C shaped main member having an elongated center portion and a pair of parallel arm portions, wherein each arm portion is disposed on opposing ends of said center portion and comprises at least one fastener;

an elongated rail member removably coupled to said pair of arm portions by said fasteners, said rail member further comprising a pair of rail slots disposed on opposite ends for insertingly receiving said pair of arm portions; and, a pair of curb members removably coupled to said pair of arm portions by said fasteners, each of said curb members further comprising a generally L shaped member having a leg portion with a curb slot for receiving said arm portion and a downwardly perpendicular foot portion for contact with a vertical surface of said curb;

wherein when said rail member is coupled to said main member an open space between said main member center portion and said rail member defines a liner parking lot painting area; and, wherein when said pair of curb members is coupled to said main member an open space between said main member center portion and said curb vertical surface defines a curb painting area.

16. The device of claim 15, wherein said fastener further comprises a spring return mechanism having a head protruding beyond an upper surface of said arm portion;

wherein said head actuates downwardly to at least a coplanar position relative to said arm portion upper surface.

17. The device of claim 16, wherein said rail member further comprises a pair of rail apertures disposed on opposite ends of an upper surface aligned with said pair of rail slots and each of said pair of curb members further comprises a curb aperture disposed on an upper surface of said leg portion;

wherein said pair of rail apertures selectively receive a corresponding pair of fastener heads for marking said painted lines on said parking lost surface and said curb apertures selectively receive a corresponding pair of fastener heads for marking said painted lines on said curb surface.

18. The device of claim 17, wherein each of said arm portions further comprises a plurality of fasteners;

wherein a pair of opposing fastener heads insertingly engages said pair of rail apertures to adjustably couple said rail member to said main member; and, wherein a selected fastener head of each arm portion insertingly engages said curb aperture of each leg portion to adjustably couple said curb member to said main member.

19. A method of stenciling a painting area on a work surface, said method comprising the steps of:

providing said work surface being a parking lot;

providing a template device comprising a generally C shaped main member having an elongated center portion and a pair of parallel arm portions, wherein each arm portion is disposed on an opposing end of said center portion; and, an elongated rail member having a pair of rail slots disposed on opposite ends, wherein said pair of rail slots insertingly receives said pair of arm portions to couple said rail member to said main member;

coupling said rail member to said main member such that an open space between said main member center portion and said rail member defines said painting area; and, painting said painting area.

20. The method of claim 19, further comprising the steps of:

providing said work surface being a curb;

providing said template device further comprising a pair of curb members further comprising a generally L shaped member having a leg portion and a downwardly perpendicular foot portion, wherein said leg portion further comprises a curb slot for receiving said arm portion and said foot portion contacts a vertical surface of said curb;

coupling said pair of curb members to said main member such that an open space between said main member center portion and said curb vertical surface defines said painting area; and, painting said painting area.

* * * * *